United States Patent [19]
Hedley

[11] Patent Number: 5,988,316
[45] Date of Patent: Nov. 23, 1999

[54] ACCESS DEVICE

[75] Inventor: Robert Ian Hedley, New South Wales, Australia

[73] Assignee: Justoy Pty Ltd, Australia

[21] Appl. No.: 08/805,427

[22] Filed: Feb. 25, 1997

[30] Foreign Application Priority Data

Feb. 27, 1996 [AU] Australia .............................. PN8330/96

[51] Int. Cl.⁶ ...................................................... B60R 3/02
[52] U.S. Cl. ............................................. 182/127; 182/97
[58] Field of Search ................................ 182/97, 127, 83, 182/86, 89; 280/166, 163

[56] References Cited

U.S. PATENT DOCUMENTS 3,190,392  6/1965  Ashton ....................................... 182/97

*Primary Examiner*—Alvin Chin-Shue
*Attorney, Agent, or Firm*—Cesari and McKenna, LLP

[57] ABSTRACT

An access device for providing access between a substrate surface and an elevated surface. The access device comprises a ladder having first and second ends, the ladder including first and second side members connected by a plurality of cross members extending between the ends of the ladder. The ladder is pivotally connected to a rotary axle extending horizontally from the support surface so that the ladder may be moved between a substantially downwardly outwardly disposed boarding position and a substantially horizontally disposed storage position. The ladder is movable between the boarding position and the storage position and vice versa such that in a first step, the ladder is rotated on the axle by at least 90° from the boarding position to a first intermediate position, in a second step, the ladder is pivoted between the first intermediate position and a second intermediate position wherein the second end of the ladder extends substantially above the elevated surface, and, in a third step, by rotation of the axle in the opposite direction, the ladder is moved between the second intermediate position and the storage position.

5 Claims, 7 Drawing Sheets

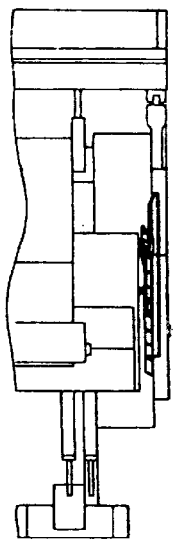
FIG. 1(f)
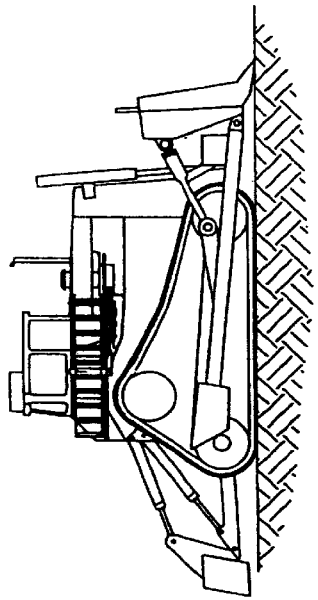
FIG. 1(d)
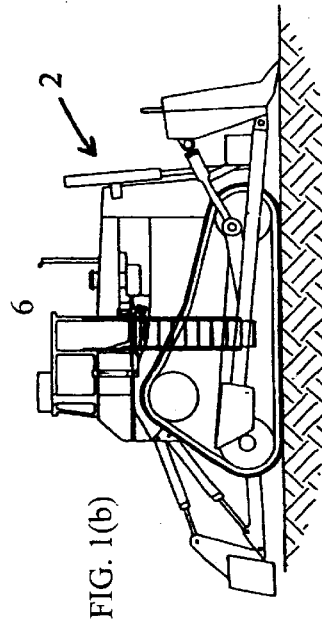
FIG. 1(b)
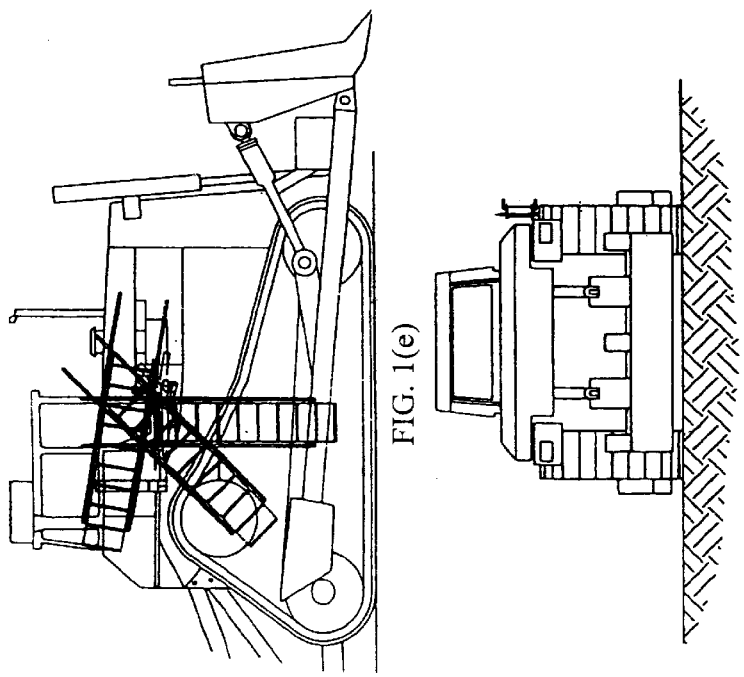
FIG. 1(e)
FIG. 1(c)
FIG. 1(a)
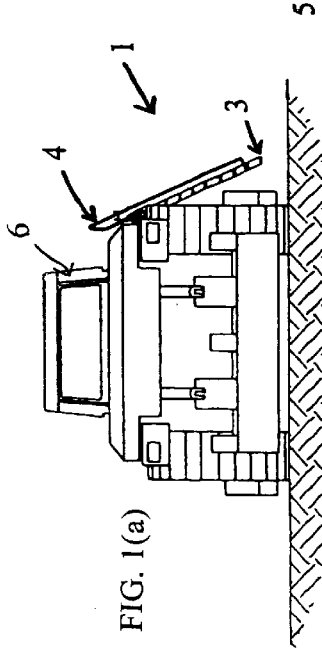

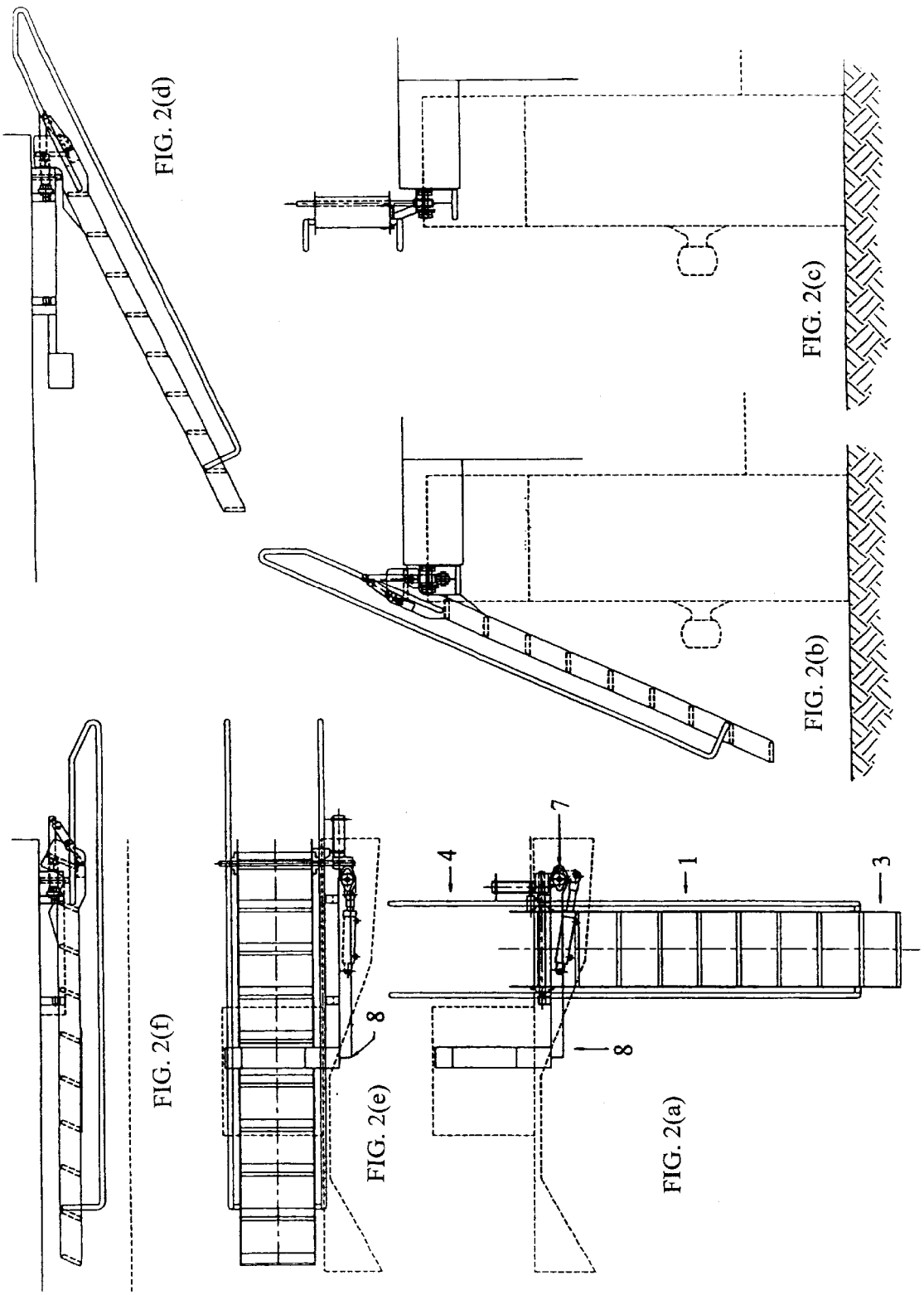

ACCESS DEVICE

FIELD OF THE INVENTION

The present invention relates to an access device, such as a ladder, which provides access between a substrate surface and an elevated surface. The present invention, in particular, relates to a movable access device, which is rotatable between a first "boarding" position, and a second "storage" position.

BACKGROUND AND RELATED ART

A variety of different access devices are presently known, to provide access between an operable or boarding position, and, a storage position.

One such prior art access device is disclosed in the Applicant's earlier Australian Application No. 67555/94, and corresponding overseas applications.

The Applicant's earlier access device provides access between a substrate surface and an elevated surface of a vehicle whereby the device is provided with a pair of rigid arms on each side member of the access device, such that, the device is pivotally moveable from a stable lower position to a stable upper position. In the lower position, that access device is inclined at between 60° and 75° relative to a substantially horizontally substrate surface, with the upper end of the access device was positioned substantially adjacent to and forwardly of the elevated surface. In the upper position, that access device is positioned substantially vertically or at a rearwardly inclined angle in a position which is totally upward and rearward of the elevated surface.

In the Applicant's earlier aforementioned application, the access device always remains in a substantially upwardly/downwardly disposed position.

While the Applicant's earlier access device invention provides significant advantages over prior art devices, it has been discovered by the Applicant that it is, in many instances, more useful if the device is not upwardly standing when being stored, but rather, is stored in a substantially horizontal position on the side or across the front or rear of the vehicle.

SUMMARY OF THE INVENTION

The present invention seeks to provide an access device which may be used as an alternative to the aforementioned device, and, which overcomes certain disadvantages of prior art access devices.

The present invention also seeks to provide an access device which is conveniently rotated between a boarding position and a storage position, and which takes up minimal space in the storage position.

The present invention also seeks to provide an access device which, in the boarding position, is provided at any convenient angle which complies with local and/or international standards or regulations.

In one broad form, the present invention provides an access device for providing access between a substrate surface and an elevated surface, said access ladder comprising first and second side members connected by a plurality of cross-members extending from a first end of said access device to a second end of said access device;

said access device being pivotally attached to said elevated surface by a rotating axle extending substantially horizontally outward from said elevated surface for rotation of said device between a substantially downwardly disposed boarding position and a substantially transverse storage position;

wherein, in said boarding position, said second end of said access device is substantially downwardly disposed and inclined at between 26° and 90° relative to said substrate surface; and, wherein, in said storage position, said ends of said access device are rotated, said device resting at least partially on one side member thereof;

whereby, said access device is movable from said boarding position and said storage position, and vice versa, wherein, in a first step, said device is rotated about said axle from said boarding position to a rotated position; and, in a second step, said device is retracted such that said second end of said device is retracted towards said elevated surface.

Preferably, in said first step, said device is rotated between about 45° and about 180°.

Preferably, in said storage position, said device is substantially horizontally disposed.

Preferably, in moving said access device from said boarding position to said storage position, in said first step, said device is rotated by about 100°, and, in a third step, following said second step, said device is further rotated, by about 10°, in an opposite direction to said rotation of said first step.

Also preferably, in said storage position said device is retained by a retaining means.

Preferably, movement may be effected manually or by hydraulic, pneumatic, spring and/or other mechanical or electric drive means.

Preferably, in said first step, said movement is effected by actuation of said rotating axle, and, in said second step, said movement is effected by actuation of a hydraulic cylinder or the like.

Preferably, in said third step, said movement is also effected by actuation of said rotating axle.

Perhaps most preferably, wherein in said boarding position, said access device is inclined at approximately 65° relative to a substrate surface.

In a preferred embodiment, said device provides access between a substrate surface and an elevated position of a vehicle.

Perhaps most preferably, said vehicle is earthmoving equipment.

BRIEF DESCRIPTION OF THE DRAWINGS

The present invention will become more fully understood from the following detailed description of the preferred but non-limiting embodiments thereof, described in connection with the accompanying drawings, wherein:

FIGS. 1(a)–1(f) illustrate the access device in various positions, including the boarding position and the storage position;

FIGS. 2(a)–2(f) illustrate a more detailed view of the access device shown in FIGS. 1(a)–1(f);

DETAILED DESCRIPTION OF PREFERRED EMBODIMENTS

Figure 3B:
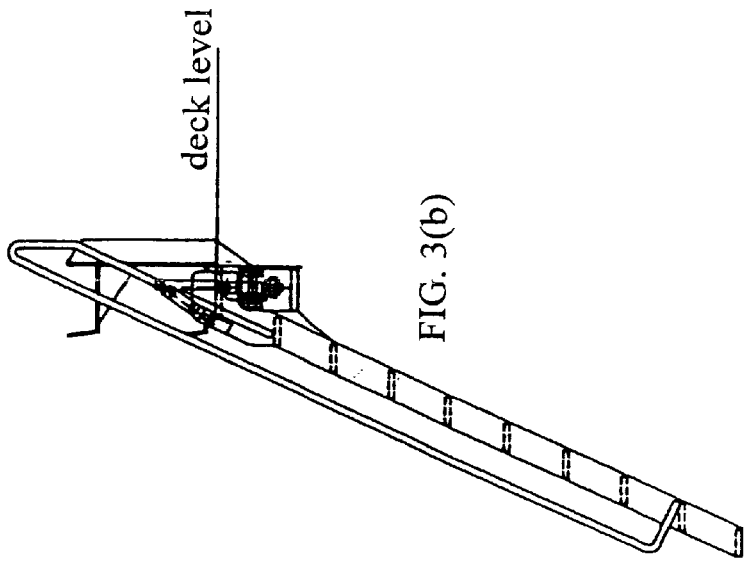
FIGS. 3(a)–3(c), 4(a)–4(c), 5(a)–5(c), 6(a)–6(c), 7(a) and 7(b) illustrate the four primary positions of the access device described in the preferred embodiment of the invention, in front, elevational and plan views thereof, FIGS. 3 illustrating the boarding position, FIGS. 4 illustrating the rotated position, FIGS. 5 illustrating the retracted position, FIGS. 6 illustrating the stored position, and FIGS. 7 showing perspective views of a ladder in the 'up' and 'down' positions.
Figure 3C:
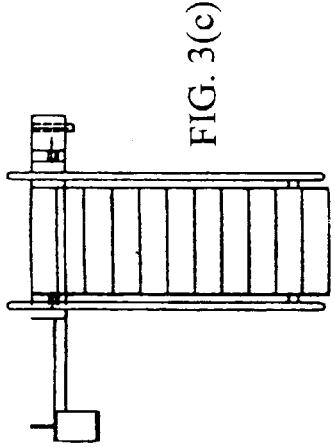

Throughout the drawings, like numerals will be utilized to identify similar features, except where expressly otherwise indicated.

As illustrated in FIGS. 1(a)–1(f), the access device, generally designated by the numeral 1, is, in accordance with the preferred embodiment of the present invention, adapted to the side of a vehicle, such as earthmoving equipment 2. FIGS. 1(a) and 1(b) illustrate the access device 1 in the boarding position, whereby the access device is substantially downwardly disposed, with it's second end 3 provided adjacent to or above a substrate surface 5, and the first end 4 thereof positioned adjacent an elevated surface, near to, for example, a cabin 6 on the vehicle. As seen, in FIG. 1(a), the access device 1 is inclined at an angle of about 60° to 75° relative to the substrate surface. Obviously, the desired angle of the access device will be variable, and may depend upon local Government or international standards or regulations to ensure safe use of the device.

FIGS. 1(c), 1(d) and 1(f) illustrate the access device in the stored position, wherein it will be seen that the ends 3 and 4 of the device are substantially horizontally aligned compared to the substrate surface 5, where the access device 1 rests on one side member thereof. It will however be appreciated that the device need not necessarily be provided in a horizontal position. In some applications, the storage position may preferably be between say 45° and 180°. As best seen in FIGS. 1(c) and 1(f), in the storage position, the access device is positioned within the outer extremities of the vehicle, ensuring that the ladder is not able to be knocked or bumped during use of the vehicle.

FIG. 1(e) illustrates how the device may be rotated about a pivotal axis between the boarding and the storage positions. As seen in FIG. 1(e), the device is preferably rotated by about 100° such that it can clear a cradle, rack, track or the like, within which it rests, in the storage position.

Figure 3A:
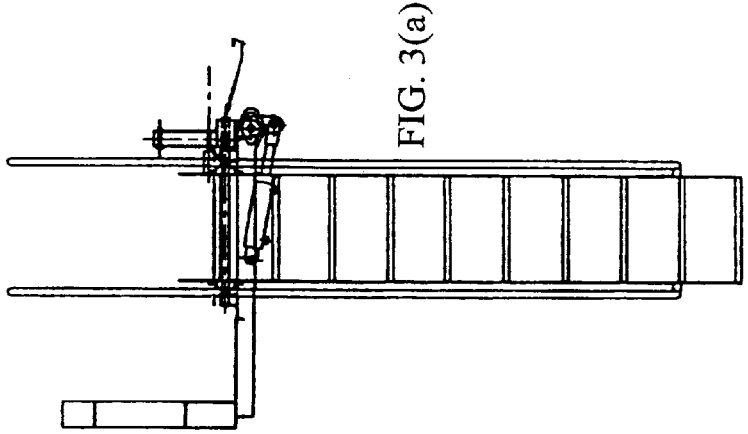

FIGS. 2(a)–2(f) illustrate the use of the device in the various positions. As seen there, the device is adapted to be pivotally rotated about a substantially horizontally disposed axle 7 between the boarding and the storage positions. An appropriate hydraulic, pneumatic or other mechanical or electric drive 7a (FIGS. 3(a) and 5(a)) may be used to effect the rotation. Movement of the ladder between the boarding and storage positions may be effected in either a two or three-step operation. Most preferably, the movement is effected in a three-step operation whereby the ladder is moved to a storage position behind a retaining means 8.

Details of the three-step embodiment will now be described with reference to FIGS. 3(a)–3(c) to 6(a)–6(c).

In each of Figures those figures, there are shown, front, elevational and plan views of the device in FIGS. 3(a) to 6(a), 3(b) to 6(b), and 3(c) to 6(c), respectively.

To move the access ladder between the boarding position (FIGS. 3) and the stored position (FIGS. 6), as previously mentioned, the device is moved in three discrete steps.

In the first step the ladder is simply rotated about the axle 7, which axle is substantially horizontally disposed. Rotation of about 100°, to a position shown in FIGS. 4, which is being termed herein as the rotated position, is preferably effected.

Figure 4B:
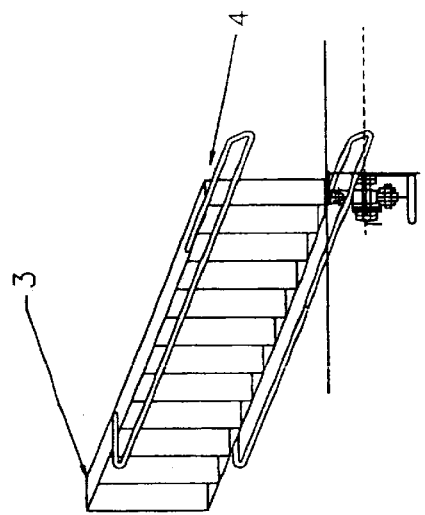
Figure 4C:
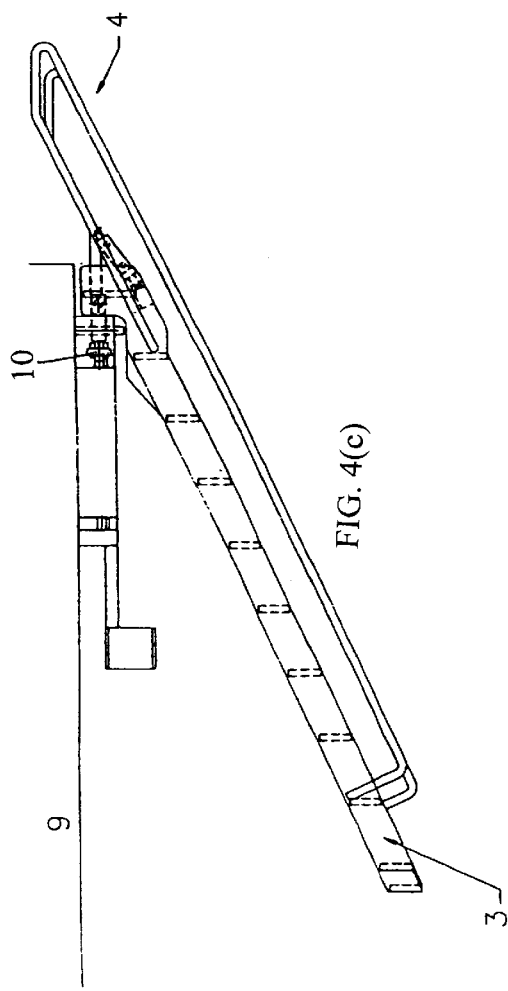
Figure 4A:
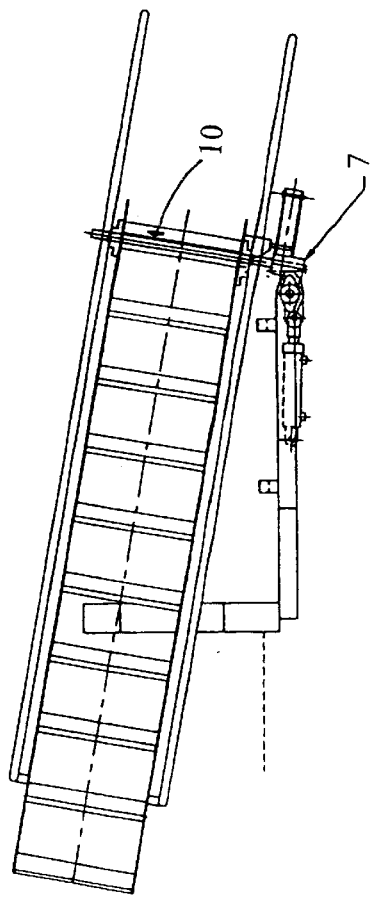
Figure 5B:
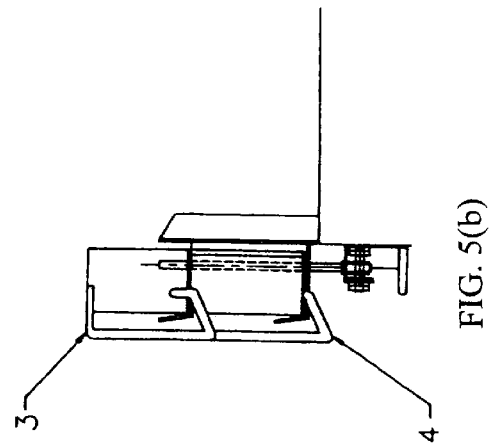
Figure 5C:
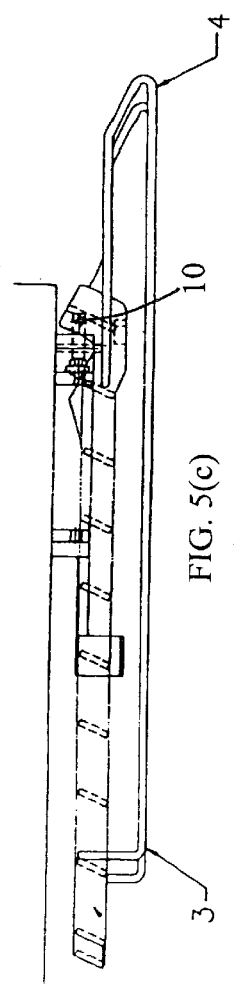
Figure 5A:
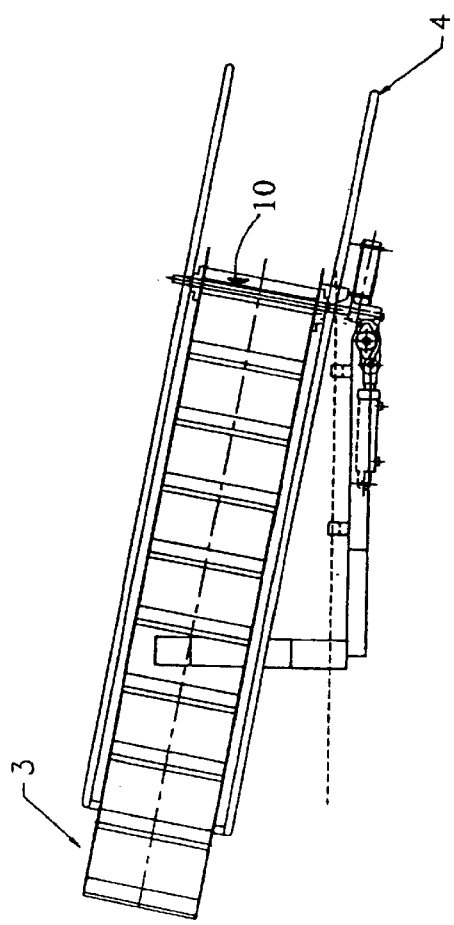

From the rotated position shown in FIGS. 4, the ladder is then retracted to the retracted position, shown in FIGS. 5, by retracting the second end 3 towards the elevated surface 9 about a pivot 10 that connects the ladder side members to axle 7 as best seen in FIGS. 5 and 7.

The final step moves the ladder from the retracted position, shown in FIGS. 5, to the stored position, shown in FIGS. 6, where the end 3 of the ladder 1 is lowered to rest behind the retaining means 8. The retaining means 8 may be embodied as a cradle supporting the ladder, to reduce fatigue to mechanical components through vibration and to prevent accidental lowering of the ladder/stairway during operation.

Figure 7A:
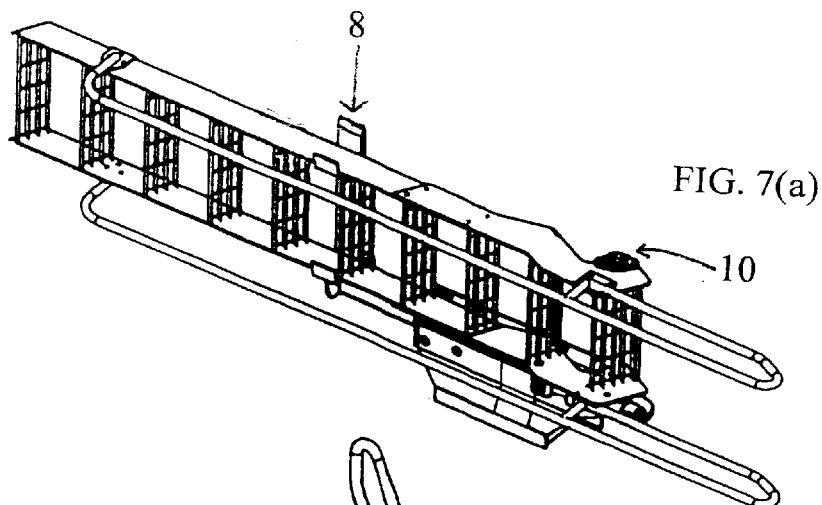
Figure 7B:
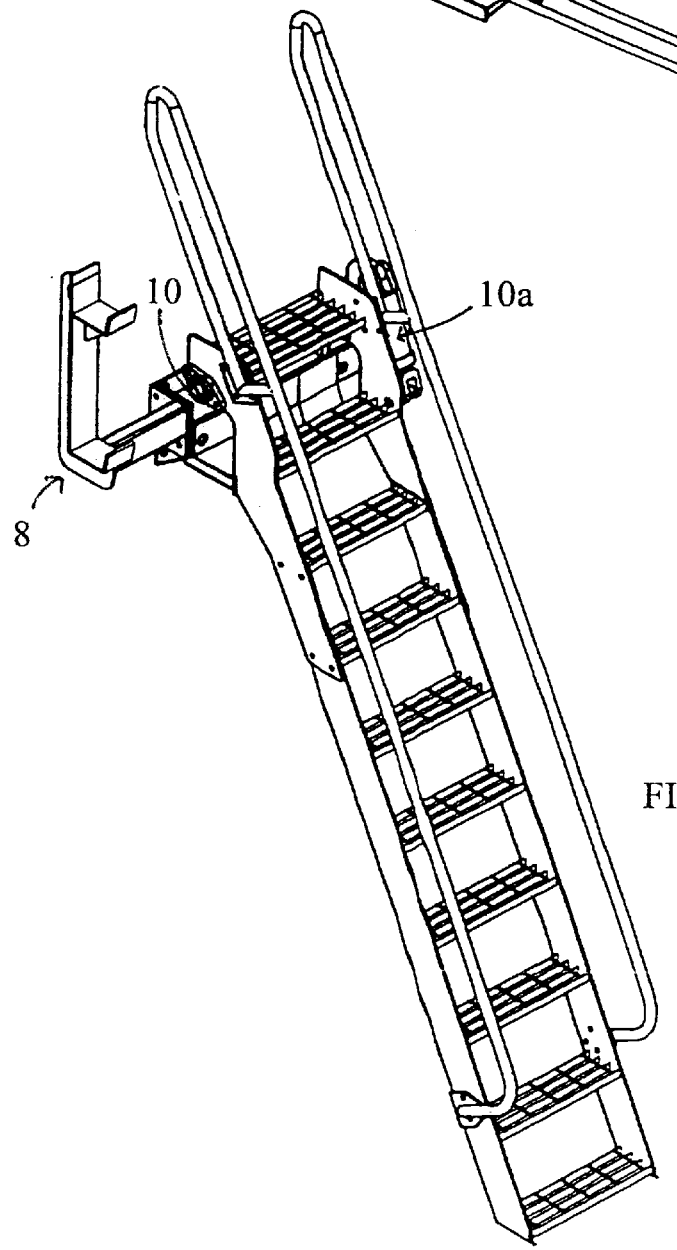

For ease of understanding, FIGS. 7 shows, in FIGS. 7(a) and 7(b), the 'up' and 'down' positions, respectively, of the ladder in accordance with the present invention.

Actuation of the device may be performed manually, but is more preferably achieved automatically, by means of hydraulic, pneumatic and/or electric drives. An appropriate electronic control circuit, Programmable Logic Circuit, etc., may be utilized. Most preferably, movement in the first step is effected by hydraulic cylinder 7a of the rotating axle 7 about 100°, and movement in the third step is also achieved by hydraulic actuation of the rotating axle in a direction opposite to that of the first step, by about 10°.

Figure 6B:
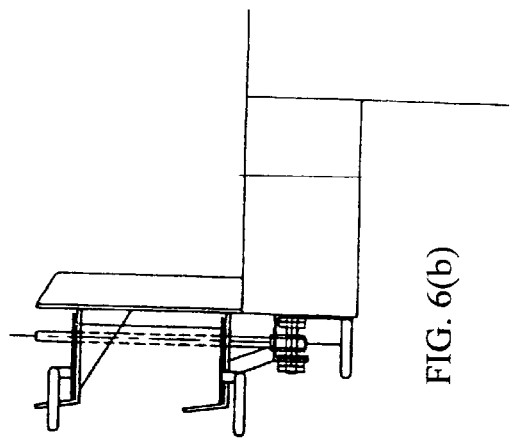
Figure 6C:
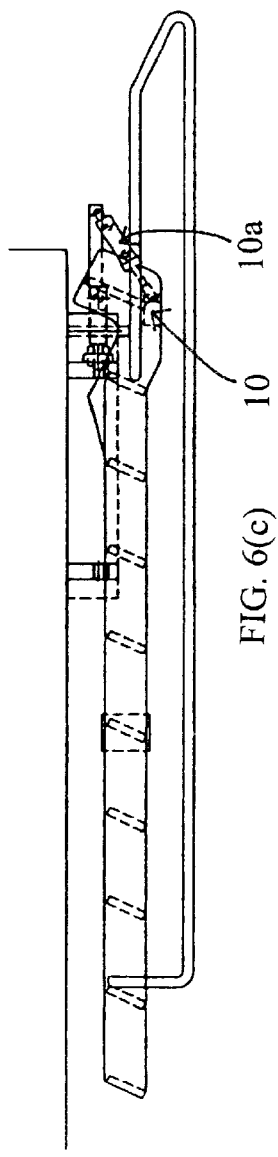
Figure 6A:
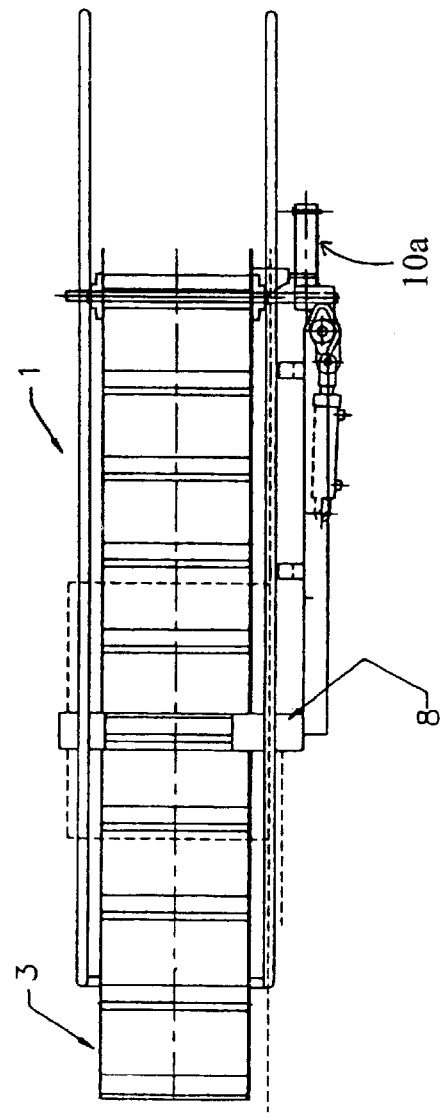

Most preferably, in the second step, movement is effected by actuation of a hydraulic cylinder 10a or the like shown in FIGS. 6(a), 6(c) and 7(b).

It will be appreciated that numerous variations and modifications will be envisaged to the device of the present invention. For example, in the event that it is not necessary to retain the access device behind the retaining means 8, the access device might simply undergo a two step operation whereby, in the first step, the device is rotated, say by 90°, and the second step, merely withdraws the second end 3 of the device towards the elevated surface 9.

As hereinbefore mentioned, the device is preferably disposed, in the boarding position, at an angle of approximately 26° to 90°, but most preferably between 60° to 75° relative to the substrate surface. Most preferably perhaps, this angle is 65°, as this is a convenient angle for an operator to climb up and down the device.

It will be appreciated that there are a wide variety of applications for such an access device. It will be apparent that the ladder is adapted to provide access to any type of vehicle, particularly, earthmoving equipment, wherein large clearance under a vehicle and typically large vehicles are used. Provision of such a ladder will allow for easy access of an operator to the vehicle, but also allow for complete retraction of the ladder out of the way of any earthmoving operation. Uses for the device in applications other than with vehicles are also envisaged. For example, the ladder may be adapted to coal washeries and other processing plants where there exist space limitations.

It will also be understood that there are other applications for the device other than as a ladder. For instance, other access devices, such as conveyor belts, etc., may be envisaged to provide easy access between a substrate and an elevated surface.

While a particular embodiment of the access device has been hereinbefore described, it will be understood that numerous variations and modifications to such an access device will be envisaged by persons skilled in the art. All such variations and modifications should be considered to fall within the spirit and scope of the invention as broadly hereinbefore described.

I claim:

1. A retractable access device for providing access between a substrate surface and an elevated surface, a ladder having first and second ends and including first and second side members and a plurality of spaced-apart cross members extending between said side members;

a rotatable axle;

a pivot pivotally attaching said ladder to said axle so that said ladder can pivot about an axis perpendicular to said axle, and means for mounting the axle relative to an elevated surface so that the axle is substantially horizontally disposed whereby when the axle is mounted to the elevated surface, the ladder is movable between a boarding position wherein the ladder is substantially downwardly and outwardly disposed and a storage position wherein the ladder is substantially horizontal and rests on said first side member adjacent to the elevated surface, and vice versa, wherein in a first step, by rotation of said axle, said ladder is moved between said boarding position and a first intermediate position wherein the second end of the ladder extends substantially upwardly and outwardly from the elevated surface, in a second step, the ladder is pivoted on the pivot between said first intermediate position and a second intermediate position wherein the second end of the ladder is located relatively close to and above the elevated surface, and in a third step, by rotation of said axle in an opposite direction to said rotation in the first step, said ladder is moved between said second intermediate position and the storage position.

2. The retractable access device as defined in claim 1, wherein, in said boarding position, said device is substantially downwardly and outwardly disposed at an angle of about 60° to 75° relative to the substrate surface.

3. The retractable access device as defined in claim 1 or 2 and further including means for rotating said axle, and means for pivoting said ladder relative to said axle.

4. The retractable access device as defined in claim 3 and further including means for pivoting said ladder relative to said axle.

5. A retractable access device as defined in claim 4 and further including a retainer for mounting to said elevated surface to retain said ladder in said storage position.

* * * * *